UNITED STATES PATENT OFFICE.

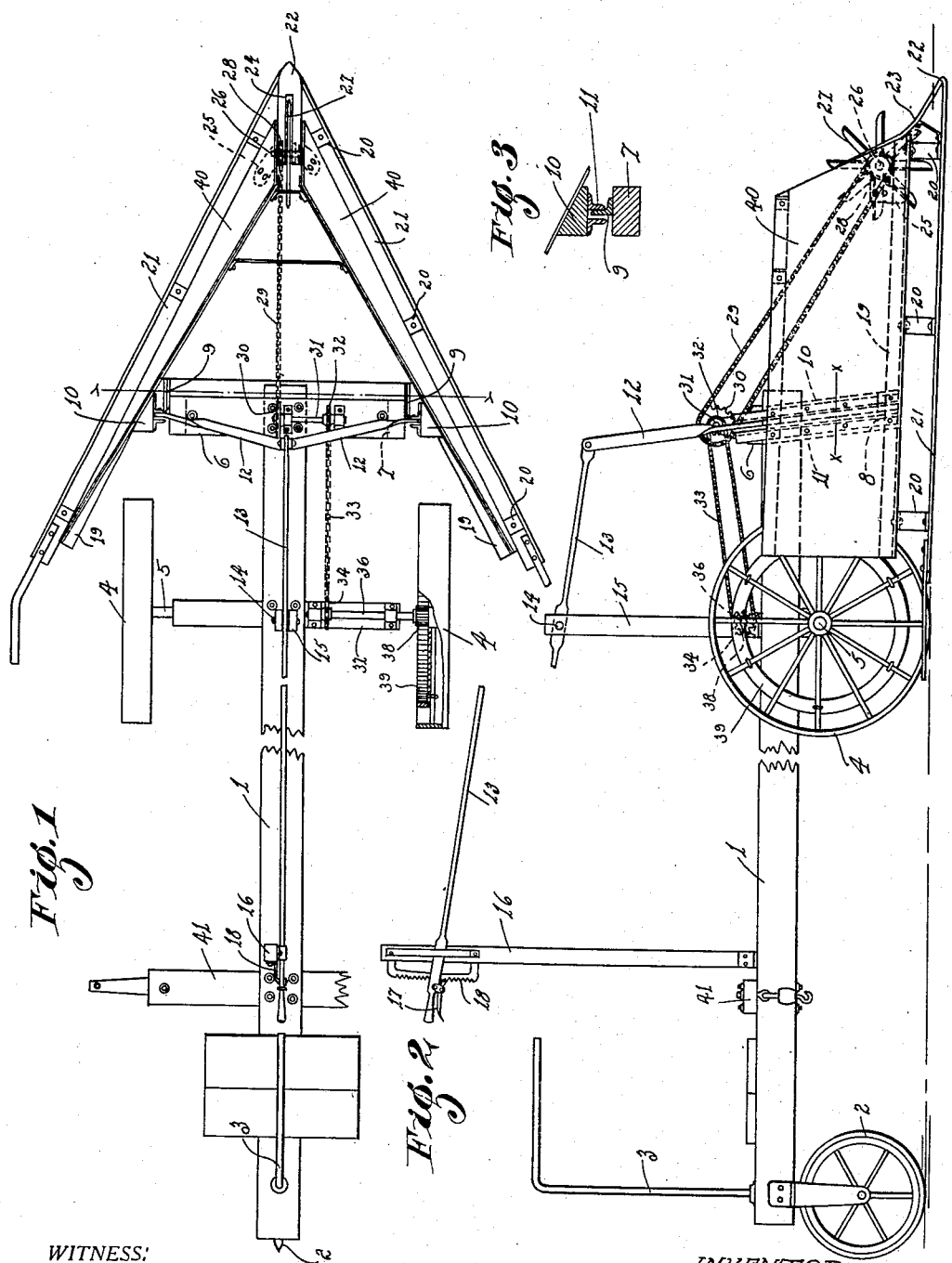

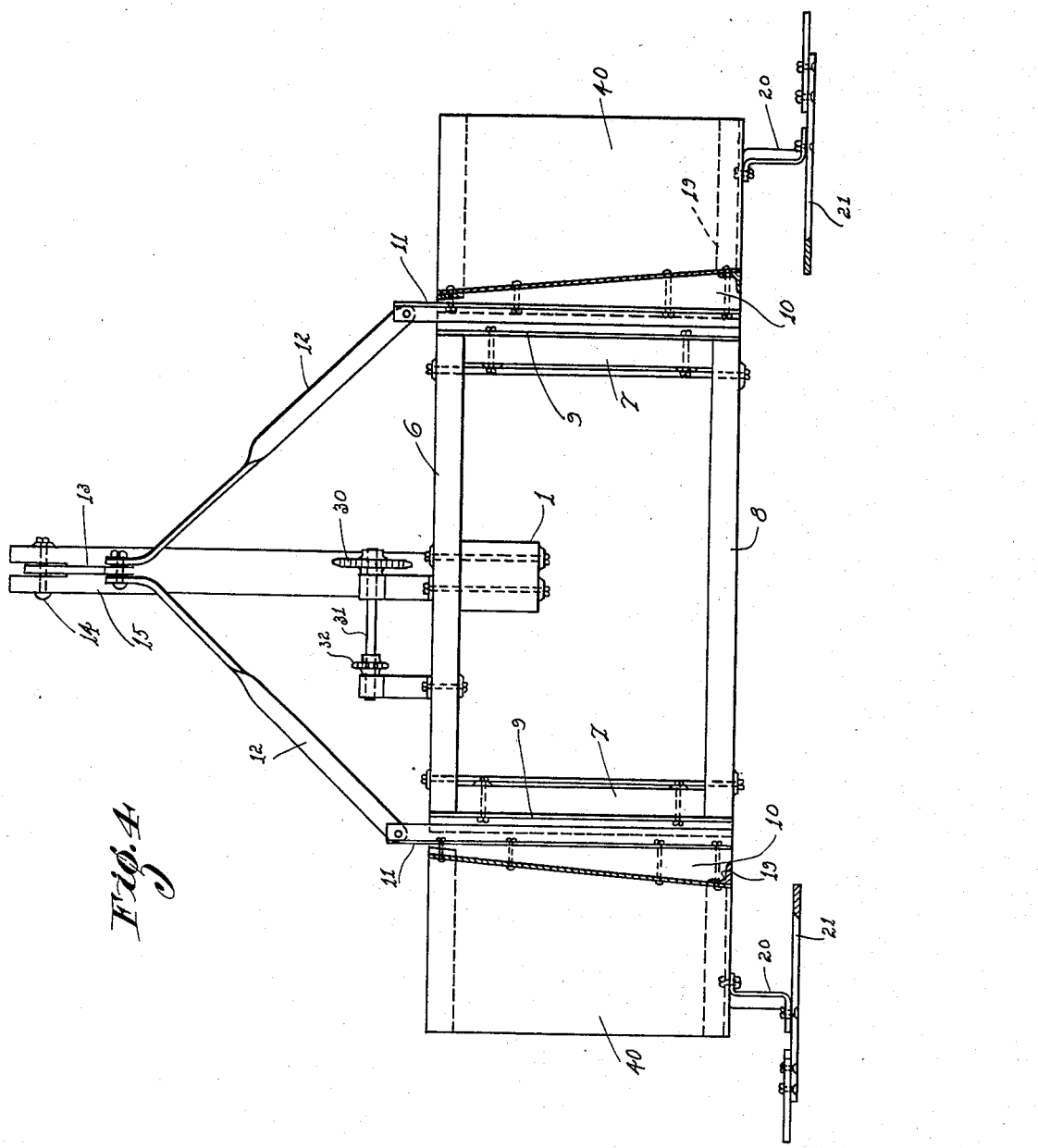

HORACE S. FOUTZ, OF MODESTO, CALIFORNIA.

BEAN-CUTTER.

1,171,603.  Specification of Letters Patent.  Patented Feb. 15, 1916.

Application filed October 2, 1915. Serial No. 53,702.

*To all whom it may concern:*

Be it known that I, HORACE S. FOUTZ, a citizen of the United States, residing at Modesto, in the county of Stanislaus and State of California, have invented certain new and useful Improvements in Bean-Cutters; and I do declare the following to be a clear, full, and exact description of the same, reference being had to the accompanying drawings, and to the characters of reference marked thereon, which form a part of this application.

This invention relates to improvements in implements for the cutting of field beans when they are ready to harvest, the object of the invention being to produce such a cutter as will readily and easily move between the rows of beans and cut the same and pile them in windrows ready for shucking and harvesting. The windrows are so formed and the cutter is so operated as to leave a clear space between the windrows of cut beans where the horses operating the implement may walk without trampling on the beans. In most of the now commonly used cutters, the horses move in advance of the implement and in this manner are continuously walking on the beans, thus causing a great loss, while with my device the cutter is in advance of the horses and clears a space for them to travel in.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 1 is a top plan view of the complete device partly broken out as to length. Fig. 2 is a similar view showing a side elevation of the device. Fig. 3 is a sectional view taken on a line X—X of Fig. 2. Fig. 4 is a sectional view taken on a line Y—Y of Fig. 1.

Referring now more particularly to the characters of reference on the drawings, the numeral 1 designates the main supporting beam for the device which is of a considerable length and is supported at one end on a tiller wheel 2 having the usual operating handle 3. The forward end of the beam 1 is mounted on a pair of suitably constructed supporting wheels 4 having an axle 5 to which the beam 1 is suitably secured. On the forward end of the beam 1 I secure an inclined rectangular frame consisting of a top member 6, two side members 7, and a bottom member 8, this frame being rigidly secured to the outer end of the beam 1.

On the outer sides of the members 7, I provide two angle irons 9, which angle irons act as guides for the cutter proper, which cutter proper is comprised of the following structure, to-wit: Two supporting vertical beams 10 are each provided with a pair of spaced angle irons 11, which angle irons 11 receive the angle irons 9 whereby the beams 10 may be raised and lowered along the angle irons 9 to raise or lower the cutter for a purpose as will presently appear. To the upper ends of the members 10 are pivotally secured connecting links 12 which converge and are fastened to an operating lever 13 which is fulcrumed at 14 on a post 15 secured to the beam 1. Said lever 13 then projects to a point adjacent the tiller wheel operating handle 3 where it moves through a guide post 16 and has a spring pressed catch handle 17 operable over a rack 18, whereby the lever may be fixed at different positions. The lever 13 at its pivotal end will naturally describe a small arc as the end 17 is lowered and this action would tend to cause the angle irons 11 to bind against the angle irons 9 unless some way was provided to overcome this tendency. I therefore make the space between the irons 11 of a greater width than the thickness of the irons 9 which will allow of a degree of looseness between the parts sufficient to overcome the binding tendency occasioned by the said member 13 moved through the arc aforesaid.

On the lower end of each member 10 is secured an angle iron 19, which angle irons converge to a point at their forward ends forming a substantial V-shaped frame which is suitably placed in any desired manner. Projecting downwardly from the angle irons 19 are supporting straps 20 which support the cutter knives 21 which project in a substantial V-shape as shown and converge at their outer ends where they are provided with a nose 22 which curves upwardly, as at 23, where it is provided with a guide slot 24.

Mounted in bearings 25, supported upwardly from the forward end of the angle irons 19, is a shaft 26 carrying a cutter wheel 27, the blades of which project forwardly through the slot 24. On the shaft 26 is also a sprocket wheel 28 connected by a chain 29 with another sprocket wheel 30 mounted on a shaft 31 secured to the top of the member 6. On said shaft 31 is another sprocket wheel 32 connected by a chain 33 with a sprocket wheel 34 secured to a shaft 36 suitably journaled on a beam 37 on the axle 5. On the other end of the shaft 36 is a pinion 38 which engages an internal pinion 39 suitably arranged on one of the wheels 4. With the advance of the cutter between the rows of beans, the nose 22 works under the interwoven vines between the rows and causes the same to ride upwardly on the curved portion 23 where the action of the cutter wheel 27 serves to sever the interwoven vines of adjacent rows distinctly from each other leaving the two rows free to be cut and moved into windrows.

Secured to the angle irons 19 and to the members 7 and converging at their forward ends to a V-shape point are deflector guide plates 40 which completely inclose all the forward mechanism of the cutter.

In practice, the horses are hitched to the whipple-trees 41 at the rear of the beam 1 and moved to the rear of the V-shaped cutter mechanism. With the advance of the machine, the V-shaped cutter mechanism, as indicated, moves between the rows and can be raised or lowered by means of the lever 13 to proper position. The cutter wheel 27 severs the connection between the opposite rows and the deflecting plates 40 shove the opposite rows apart, while the blades 21 cut the roots thereof, the said plates 40 then distributing the rows into windrows at a predetermined distance apart leaving an intervening clear space to the rear of the cutter through which the horses may move without trampling on the bean vines.

When not in use, for the purpose of transportation from one point to another, the cutter may be completely raised by the lever 13 so as not to be near the ground surface.

From the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claims.

Having thus described my invention, what I claim as new and useful and desire to secure by Letters Patent is:—

1. A bean cutter of the character described comprising a wheel mounted support, a pair of vertical beams mounted on the support, a guide on each beam, a pair of independent beams movable on such guides, a V-shaped fender mounted on such movable beams, cutters on the fender, and means for raising and lowering said movable beams, as described.

2. A bean cutter of the character described comprising a wheel mounted supporting structure, a vertically disposed rectangular frame carried by the supporting structure, a guide on each end of the rectangular frame, an independent beam movable on each guide, a cutter and fender structure mounted on the independent beams, and means for raising and lowering said movable beams, as described.

3. A bean cutter of the character described comprising a supporting frame, a V-shaped cutter frame carried by the supporting frame, a nose at the apex of the V-shaped cutter frame, such nose being provided with a slot, and a revoluble cutter wheel operating through said slot, as described.

4. A bean cutter of the character described comprising a supporting frame, a cutter frame mounted on the supporting frame, a nose on the cutter frame provided with a slot, a revoluble cutter wheel projecting through said slot, said nose curving from its forward end rearwardly and upwardly toward the cutter wheel to lift and carry the bean vines into proximity with the cutter wheel, as described.

5. A bean cutter of the character described comprising a beam mounted on wheels, guides secured to the forward end of said beam, a V-shaped frame movable on the guides, cutting blades arranged along the lower edges of said V-shaped frame, guards disposed on the frame above the cutting blades, a nose on the frame provided with a slot, and a revoluble cutter projecting through the slot, as described.

In testimony whereof I affix my signature in presence of two witnesses.

HORACE S. FOUTZ

Witnesses:
   VERADINE WARNER,
   FLOYD M. BLANCHARD.

Copies of this patent may be obtained for five cents each, by addressing the "Commissioner of Patents, Washington, D. C."